(12) United States Patent
Fujita et al.

(10) Patent No.: US 10,933,613 B2
(45) Date of Patent: Mar. 2, 2021

(54) HEAT-RAY SHIELDING FILM AND METHOD FOR MANUFACTURING THE SAME, AND HEAT-RAY SHIELDING LAMINATED TRANSPARENT BASE MATERIAL

(71) Applicant: SUMITOMO METAL MINING CO., LTD., Tokyo (JP)

(72) Inventors: Kenichi Fujita, Chiba (JP); Hiroshi Kobayashi, Chiba (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 139 days.

(21) Appl. No.: 16/381,381

(22) Filed: Apr. 11, 2019

(65) Prior Publication Data

US 2019/0232618 A1   Aug. 1, 2019

Related U.S. Application Data

(62) Division of application No. 14/009,870, filed as application No. PCT/JP2012/002553 on Apr. 12, 2012, now Pat. No. 10,307,993.

(30) Foreign Application Priority Data

Apr. 14, 2011  (JP) .................... 2011-090513

(51) Int. Cl.
   *B32B 17/10*   (2006.01)
(52) U.S. Cl.
   CPC .. *B32B 17/10633* (2013.01); *B32B 17/10688* (2013.01); *B32B 17/10761* (2013.01)
(58) Field of Classification Search
   None
   See application file for complete search history.

(56) References Cited

U.S. PATENT DOCUMENTS

| | | | |
|---|---|---|---|
| 8,853,314 B2 | 10/2014 | Mamak et al. | |
| 2006/0110593 A1 | 5/2006 | Fukatani et al. | |
| 2006/0116452 A1 | 6/2006 | Tsuji et al. | |
| 2007/0256782 A1 | 11/2007 | Haldeman et al. | |
| 2009/0035583 A1 | 2/2009 | Fisher | |
| 2011/0195235 A1 | 8/2011 | Kato et al. | |

FOREIGN PATENT DOCUMENTS

| | | | |
|---|---|---|---|
| EP | 1 640 348 A1 | 3/2006 | |
| EP | 2 163 921 A1 | 3/2010 | |
| EP | 2 213 490 A1 | 8/2010 | |
| JP | H04-160041 A | 6/1992 | |
| JP | H08-217500 A | 8/1996 | |
| JP | H08-259279 A | 10/1996 | |
| JP | H10-297945 A | 11/1998 | |
| JP | 2001-089202 A | 4/2001 | |
| JP | 2010-202495 A | 9/2010 | |
| WO | 2010/030444 A1 | 3/2010 | |
| WO | WO-2010046285 A2 * | 4/2010 | ............ C01G 41/02 |

OTHER PUBLICATIONS

May 25, 2016 Office Action Issued in U.S. Appl. No. 14/009,870.
Sep. 22, 2017 Office Action issued in U.S. Appl. No. 14/009,870.
Apr. 19, 2018 Office Action issued in U.S. Appl. No. 14/009,870.
Aug. 8, 2018 Office Action issued in U.S. Appl. No. 14/009,870.
International Search Report issued in International Patent Application No. PCT/JP2012/002553 dated Jul. 19, 2012.
Written Opinion of the International Searching Authority issued in International Patent Application No. PCT/JP2012/002553 dated Jul. 19, 2012.
Sep. 23, 2016 Office Action issued in U.S. Appl. No. 14/009,870.
Mar. 28, 2016 Office Action issued in U.S. Appl. No. 14/009,870.
BASF Technical data sheet EFKA 4401, date accessed Sep. 17, 2016 <http://www.carytrad.com.tw/chemical/download/basf/efka___pa_4401.pdf>.

\* cited by examiner

*Primary Examiner* — Cheng Yuan Huang
(74) *Attorney, Agent, or Firm* — Oliff PLC

(57) ABSTRACT

To provide a heat-ray shielding film mainly composed of polyvinyl acetal resin and a method for manufacturing the same capable of exhibiting excellent optical characteristics and high weather resistance by using composite tungsten oxide fine particles having a high heat-ray shielding effect, and a heat-ray shielding laminated transparent base material using the heat-ray shielding film, the heat-ray shielding film containing fine particles having a heat-ray shielding function, polyvinyl acetal resin, and a plasticizer, wherein the fine particles having the heat-ray shielding function is expressed by a general formula $M_yWO_z$ (wherein N is one kind or more elements selected from a group consisting of Cs, Rb, K, Tl, In, Ba, Li, Sr, Fe, Sn, Al, and Cu, satisfying $0.1 \leq y \leq 0.5$, $2.2 \leq z \leq 3.0$), which are composite tungsten oxide fine particles having a hexagonal crystal structure, the heat-ray shielding film further containing metal carboxylate.

7 Claims, No Drawings

HEAT-RAY SHIELDING FILM AND METHOD FOR MANUFACTURING THE SAME, AND HEAT-RAY SHIELDING LAMINATED TRANSPARENT BASE MATERIAL

CROSS-REFERENCE TO RELATED APPLICATIONS

This is a Division of application Ser. No. 14/009,870 filed on Dec. 16, 2013, which in turn is now allowed and is a National Phase of Application No. PCT/JP2012/002553 filed on Apr. 12, 2012, which claims priority to Japanese Patent Application No. 2011-090513 filed on Apr. 14, 2011. The disclosure of each of the prior applications is hereby incorporated by reference herein in its entirety.

TECHNICAL FIELD

The present invention relates to a heat-ray shielding film and a method for manufacturing the same, having superior visible light transmittance and excellent heat-ray function, and a heat-ray shielding laminated transparent base material to which the heat-ray shielding film is applied.

BACKGROUND ART

A safety glass is used for automobiles, etc., with a structure that a laminated glass is formed by sandwiching an intermediate layer including polyvinyl acetal resin, etc., between opposed plurality of (for example, two) glass sheets, and further there is proposed a structure for the purpose of reducing a cooling load or a human feeling of heat by blocking a solar energy incident on a laminated glass having a heat-ray shielding function in the intermediate layer.

For example, patent document 1 discloses laminated glass with a soft resin layer containing heat-ray shielding metal oxide composed of tin oxide or indium oxide with a fine particle diameter of 0.1 micrometer or less, sandwiched between two opposed glass sheets.

Further, patent document 2 discloses a laminated glass with an intermediate layer sandwiched between at least two opposed glass sheets, wherein metal such as Sn, Ti, Si, Zn, Zr, Fe, Al, Cr, Co, Ce, In, Ni, Ag, Cu, Pt, Mn, Ta, W, V, and Mo, oxide of the metal, nitride of the metal, sulfide of the metal, Sb or F-doped metal, or composite of them are dispersed in the intermediate layer.

Further, patent document 3 discloses a window glass for automobiles with fine particles composed of $TiO_2$, $ZrO_2$, $SnO_2$, and $In_2O_3$, a glass component composed of organo-silicon or organic silicon compound, sandwiched between opposed transparent plate-like members.

Further, patent document 4 discloses a laminated glass with an intermediate layer composed of three layers, provided between at least two opposed transparent glass sheets, wherein metal such as Sn, Ti, Si, Zn, Zr, Fe, Al, Cr, Co, In, Ni, Ag, Cu, Pt, Mn, Ta, N, V, Mo, oxide of the metal, nitride of the metal, sulfide of the metal, and Sb or F-doped metal, or the composite of them is dispersed in a second layer of the intermediate layer, and the intermediate layer between a first layer and a third layer is formed as a resin layer.

However, conventional laminated glasses disclosed in patent documents 1 to 4 involve a problem that a heat-ray shielding function is not sufficient when a high visible light transmittance is desired.

Meanwhile, in patent document 5, an applicant discloses a heat-ray shielding laminated glass formed by including the intermediate layer having a heat-ray shielding function provided between two glass sheets, with this intermediate layer formed by a heat-ray shielding film containing hexaboride fine particles alone, or hexaboride fine particles and ITO fine particles and/or ATO fine particles, and vinyl resin, or discloses a heat-ray shielding laminated glass wherein the intermediate layer is formed by a heat-ray shielding film containing the fine particles on a surface facing inside of at least one of the glass sheets, and a heat-ray shielding film containing vinyl resin interposed between the two glass sheets.

As is described in patent document 5, according to optical characteristics of the heat-ray shielding laminated glass to which the hexaboride fine particles alone, or hexaboride fine particles and ITO fine particles and/or ATO fine particles are applied, a maximum transmittance is exhibited in a visible light region, and a strong absorption is exhibited in a near infrared region, thus exhibiting a minimum transmittance in the near infrared region. As a result, the heat-ray shielding laminated glass of the present invention is improved to 50% range of the solar transmittance when the visible light transmittance is 70% or more, compared with conventional laminated glasses described in patent documents 1 to 4.

Meanwhile, as the fine particles having a shielding function in the near infrared region, composite tungsten oxide fine particles are known in addition to the aforementioned ITO fine particles, ATO fine particles, and hexaboride fine particles. In patent document 6, inventors of the present invention disclose a heat-ray shielding laminated glass wherein polyvinyl acetal resin is replaced with ultraviolet curing resin, so that the intermediate layer is formed by a heat-ray shielding film containing a composite tungsten compound and hexaboride in the ultraviolet curing resin.

CITATION LIST

Patent Literature

Patent Literature 1:
Japanese Patent Laid Open Publication No. 1996-217500
Patent Literature 2:
Japanese Patent Laid Open Publication No. 1996-259279
Patent Literature 3:
Japanese Patent Laid Open Publication No. 1992-160041
Patent Literature 4:
Japanese Patent Laid Open Publication No. 1998-297945
Patent Literature 5:
Japanese Patent Laid Open Publication No. 2001-89202
Patent Literature 6:
Japanese Patent Laid Open Publication No. 2010-202495

SUMMARY OF INVENTION

However, as a result of a further examination, the following subjects are found by the inventors of the present invention.

A first subject is that as described above, according to the laminated glass of conventional techniques described in patent documents 1 to 4, the heat-ray shielding function is not sufficient in any one of them when a high visible light transmittance is desired. Further, a haze value showing a cloud of a transparent base material requires 1% or less for a window glass for automobiles, and requires 3% or less for a window material for buildings. However, there is still a room for improvement in the heat-ray shielding laminated glass described in patent document 5. Further, any one of the heat-ray shielding laminated glasses of the conventional techniques has insufficient weather-resistance in a case of a long-term use, and reduction (deterioration) of the visible light transmittance is also pointed out.

A second subject is that not only optical characteristics but also mechanical characteristics are requested for the heat-ray shielding laminated glass used in each kind of window material. Specifically, resistance to penetration is requested for the laminated glass, etc., such as a safety glass. Conventionally, in order to impart penetration resistance to the laminated glass, etc., polyvinyl acetal resin has been used for the intermediate layer. However, it is known that if composite tungsten oxide fine particles are contained in the polyvinyl acetal resin, the optical characteristic is reduced. Therefore, as a next best, for example, patent document 6 discloses the heat-ray shielding film wherein the polyvinyl acetal resin is replaced with ultraviolet curing resin, so that the composite tungsten compound and the hexaboride are contained in the ultraviolet curing resin. However, in the market, from a viewpoint of satisfying a mechanical strength of the safety glass, etc., the polyvinyl acetal resin is strongly requested as the resin for the intermediate layer.

In view of the above-described problems, the present invention is provided, and an object of the present invention is to provide a heat-ray shielding film and a method for manufacturing the same, and a heat-ray shielding laminated transparent base material using the heat-ray shielding film, capable of exhibiting excellent optical characteristics and high weather resistance by using composite tungsten oxide fine particles mainly composed of polyvinyl acetal resin and having a high heat-ray shielding effect.

Solution to Problem

As a result of strenuous efforts for solving the above-described problems, inventors of the present invention achieve a method comprising: previously mixing tungsten oxide fine particles having a hexagonal crystal structure shorn by a general formula $M_yWO_z$, into a part of a plasticizer added to the polyvinyl acetal resin; then mixing and dispersing a dispersant and metal carboxylate obtain a heat-ray shielding fine particle-containing plasticizer dispersion liquid; and adding the heat-ray shielding fine particle-containing plasticizer dispersion liquid and a remaining part of the plasticizer to the polyvinyl acetal resin. Then, it is found that the heat-ray shielding fine particle-containing plasticizer dispersion liquid is kneaded into polyvinyl butyral resin and is molded into a film shape by a publicly-known method such as an extrusion method and calendaring, to thereby fabricate a heat-ray shielding film having a maximum transmittance in a visible light region and having a strong absorption in a near infrared region. Further, it is also found that the heat-ray shielding film has an excellent weather resistance.

The present invention is achieved based on such a technical discovery.

Namely, in order to solve the above-described problems, a first invention provides a heat-ray shielding film containing fine particles having a heat-ray shielding function, polyvinyl acetal resin, and a plasticizer, wherein the fine particles having the heat-ray shielding function is expressed by a general formula MyWOz (wherein M is one kind or more elements selected from a group consisting of Cs, Rb, K, Tl, In, Ba, Li, Ca, Sr, Fe, Sn, Al, and Cu, satisfying $0.1 \leq y \leq 0.5$, $2.2 \leq z \leq 3.0$), which are composite tungsten oxide fine particles having a hexagonal crystal structure, the heat-ray shielding film further containing metal carboxylate.

A second invention provides the heat-ray shielding film according to the first invention, wherein metal constituting the metal carboxylate is at least one kind of elements selected from sodium, potassium, magnesium, calcium, nickel, manganese, cerium, zinc, copper, and iron.

A third invention provides the heat-ray shielding film according to the first or second invention, wherein the carboxylic acid constituting the metal carboxylate is at least one kind selected from acetic acid, butyric acid, propionic acid, hexyl acid, stearic acid, and 2-ethylhexanoic acid.

A fourth invention provides the heat-ray shielding film according to any one of the first to third inventions, wherein the metal carboxylate is at least one kind selected from manganese 2-ethylhexanoate, manganese stearate, cerium 2-ethylhexanoate, and stearic acid cerium A fifth invention provides the heat-ray shielding film according to any one of the first to fourth inventions, wherein a metal salt content of the carboxylic acid is 3 pts. wt. to 500 pts. wt. based on 100 pts. wt. of the composite tungsten oxide fine particles.

A sixth invention provides the heat-ray shielding film according to any one of the first to fifth inventions, wherein the composite tungsten oxide fine particles are fine particles with an average particle size of 40 nm or less.

A seventh invention provides a heat-ray shielding laminated transparent base material, wherein the heat-ray shielding film of any one of the first to sixth inventions exists between plurality of transparent base materials.

An eighth invention provides the heat-ray shielding laminated transparent base material according to the seventh invention, wherein at least one of the transparent base materials is glass.

A ninth invention provides a method for manufacturing a heat-ray shielding film containing fine particles having a heat-ray shielding function, polyvinyl acetal resin, plasticizer, and metal carboxylate, comprising:

a first step of dispersing into a part of the plasticizer, composite tungsten oxide fine particles, being the fine particles having the heat-ray shielding function, expressed by a general formula MyWOz (wherein M is one kind or more elements selected from Cs, Rb, K, Tl, In, Ba, Li, Ca, Sr, Fe, Sn, Al, and Cu, satisfying $0.1 \leq y \leq 0.5$, $2.2 \leq z \leq 3.0$) and having a hexagonal crystal structure, and adding and mixing metal carboxylate thereinto, to thereby manufacture a heat-ray shielding fine particle-containing plasticizer dispersion liquid; and a second step of adding and kneading the heat-ray shielding fine particle-containing dispersion liquid manufactured in the first step and the remained plasticizer into the polyvinyl acetal resin, and thereafter molding a mixture, to thereby manufacture a heat-ray shielding film.

Advantageous Effects of Invention

According to the present invention, there is provided a heat-ray shielding film capable of exhibiting excellent optical characteristics and high weather resistance, by using composite tungsten oxide fine particles mainly composed of polyvinyl acetal resin and having a high heat-ray shielding effect, and a heat-ray shielding laminated transparent base material using the heat-ray shielding film.

DESCRIPTION OF EMBODIMENTS

Embodiments of the present invention will be described hereafter in detail.

A heat-ray shielding film according to the present invention uses composite tungsten oxide fine particles expressed by a general formula MyWOz having a heat-ray shielding function and having a hexagonal crystal structure. With this structure, the composite tungsten oxide fine particles and a dispersant are dispersed in a part of a plasticizer added to polyvinyl acetal resin, to thereby obtain a dispersion liquid. Then, metal carboxylate is mixed into the obtained dispersion liquid, to thereby obtain a heat-ray shielding fine particle-containing plasticizer dispersion liquid, and the obtained heat-ray shielding fine particle-containing plasticizer dispersion liquid, the polyvinyl acetal resin, and the remained plasticizer are kneaded and molded into a film shape by a publicly-known method such as an extrusion method and calendaring, to thereby fabricate a heat-ray shielding film.

The heat-ray shielding fine particle-containing plasticizer dispersion liquid and a method for manufacturing the same, the heat-ray shielding film and a method for manufacturing the same, and a heat-ray shielding laminated transparent base material using the heat-ray shielding film, will be described in detail hereafter.

[1] the Heat-Ray Shielding Fine Particle-Containing Plasticizer Dispersion Liquid and the Method for Manufacturing the Same First, explanation will be given for the fine particles having the heat-ray shielding function, the dispersant, the metal carboxylate, and the plasticizer, being raw materials of the heat-ray shielding fine particle-containing plasticizer dispersion liquid of the present invention will be described, and further the method for manufacturing the heat-ray shielding fine particle-containing plasticizer dispersion liquid.

(1) The Fine Particles Having the Heat-Ray Shielding Function

The fine particles having the heat-ray shielding function according to the present invention, are composite tungsten oxide fine particles. The composite tungsten oxide fine particles largely absorb a light in a near infrared region and particularly the light with a wavelength of 1000 nm or more, and therefore its transmitted color tone is bluish color tone in many cases.

Preferably, the composite tungsten oxide fine particles are expressed by a general formula MyWOz (wherein M is one kind or more elements selected from a group consisting of Cs, Rb, K, Tl, In, Ba, Li, Ca, Sr, Fe, Sn, Al, and Cu, satisfying $0.1 \leq y \leq 0.5$, $2.2 \leq z \leq 3.0$), and has a hexagonal crystal structure.

A particle size of each composite tungsten oxide fine particle can be suitably selected depending on a purpose of use of the heat-ray shielding film. For example, in a case of using the heat-ray shielding film for a usage requiring transparency, preferably each composite tungsten oxide fine particle has a dispersion particle size of 40 nm or less. The reason is as follows. If the composite tungsten oxide fine particle has a dispersion particle size smaller than 40 nm, scattering is suppressed, and as a result, the light is not completely shielded, and therefore visibility of a visible light region can be maintained and simultaneously the transparency can be maintained efficiently.

When the heat-ray shielding film and the heat-ray shielding laminated transparent base material of the present invention are applied to the usage emphasizing the transparency of the visible light region in particular like a front glass of automobiles for example, the dispersion particle size of the composite tungsten oxide fine particle is set to 30 nm or less and is preferably set to 25 nm or less.

This is because light scattering in the visible light region with a wavelength of 400 nm to 780 nm by geometric scattering or Mie scattering can be reduced, provided that the dispersion particle size of the composite tungsten oxide fine particle is smaller. By reducing the scattering of the light, a situation that the heat-ray shielding film has an outer appearance of a frosted glass when being irradiated with a strong light and a clear transparency is lost, can be prevented.

This is because if the dispersion particle size of the composite tungsten oxide fine particle is 40 nm or less, the geometric scattering or the Mie scattering are reduced, and a Rayleigh scattering region is formed, and in the Rayleigh scattering region, scattered lights are reduced in inverse proportion to the sixth power of the particle size, and therefore scattering is reduced with a reduction of the dispersion particle size and the transparency is improved. Further, if the dispersion particle size of the composite tungsten oxide fine particle is 25 nm or less, the scattered lights are extremely reduced, and this is preferable.

As described above, from a viewpoint of preventing the light scattering, a smaller dispersion particle size of the composite tungsten oxide fine particle is preferable. Meanwhile, in a case that the dispersion particle size of the composite tungsten oxide fine particle is 1 nm or more, industrial manufacture is facilitated.

Further, quantity of the composite tungsten fine particles contained in the heat-ray shielding film is preferably 0.2 $g/m^2$ to 2.5 $g/m^2$ per unit area.

Components of the composite tungsten oxide fine particles and the method for manufacturing the same will be further described hereafter.

(a) Composite Tungsten Oxide Fine Particles

As examples of preferable composite tungsten oxide fine particles, $Cs_{0.33}WO_3$, $Rb_{0.33}WO_3$, $K_{0.33}WO_3$, $Ba_{0.33}WO_3$, etc., can be given. A useful heat-ray shielding characteristic can be obtained, provided that values of y, z are within the aforementioned range. An addition amount of added element M is preferably 0.1 or more and 0.5 or less, and further preferably in the vicinity of 0.33. This is because the value theoretically calculated from the hexagonal crystal structure is 0.33, and preferable optical characteristics can be obtained by the addition amount around 0.33. Further, Z is preferably in a range of $2.2 \leq z \leq 3.0$. This is because a similar mechanism as the mechanism of a tungsten oxide material expressed by WOx works in the composite tungsten oxide material expressed by MyWOz, and there is a supply of free electrons by adding element as described above in a range of $z \leq 3.0$ is further preferably in a range of $2.45 \leq z \leq 3.00$ from a viewpoint of the optical characteristics.

(b) The Method for Manufacturing the Composite Tungsten Oxide Fine Particles

The composite tungsten oxide fine particle expressed by a general formula $M_YWO_Z$ can be obtained by applying heat treatment to a tungsten compound starting material in an inert gas atmosphere or in a reducing gas atmosphere.

First, the tungsten compound starting material will be described.

Preferably the tungsten compound starting material is one kind or more of tungsten trioxide powder, tungsten dioxide powder, hydrate powder of tungsten oxide, tungsten hexachloride powder, ammonium tungstate powder, or hydrate powder of tungsten oxide obtained by dissolving the tungsten hexachloride into alcohol and drying it thereafter, or hydrate powder of tungsten oxide obtained by dissolving the tungsten hexachloride alcohol and thereafter adding water thereto and precipitating and drying the dissolved tungsten hexachloride, or tungsten compound powder obtained by drying ammonium tungstate aqueous solution, and metal tungsten powder. Further, the tungsten compound starting material contains element M in the form of an element simple body or a compound.

Wherein, in order to manufacture the starting material in which each component is uniformly mixed in a molecular level, each raw material is preferably mixed in a form of a solution, and preferably the tungsten compound starting material containing element M can be solved in a solvent such as water and organic solvent. For example, tungstate containing element M, chloride salt, nitrate, sulfate, oxalate, oxide, carbonate, and hydroxide, etc., can be given. However, the tungsten compound starting material is not limited thereto, and a solution state is more preferable.

Heat treatment in the inert gas atmosphere or in the reducing gas atmosphere will be described next. First, 650 deg C. or more is preferable as a heat treatment condition in the inert gas atmosphere. The starting material that has undergone heat treatment at 650 deg C. or more has a sufficient near infrared absorption power and is more efficient as the heat-ray shielding fine particle. The inert gas such as Ar and $N_2$ is used as the inert gas.

Further, as the heat treatment condition in the reducing gas atmosphere, heat treatment is applied to the starting material first in the reducing gas atmosphere at 100 deg C. or more and 65 deg C. or less, and subsequently heat treatment is further applied thereto in the inert gas atmosphere at 650 deg C. or more and 1200 deg C. or less. Although the reducing gas used at this time is not particularly limited, $H_2$ gas is preferable. Then, in a case of using $H_2$ as the reducing gas, 0.1% or more of $H_2$ by volume ratio is preferably mixed into the inert gas such as Ar and $N_2$, and 0.2% or more of $H_2$ further preferably mixed thereinto. If 0.1% or more of $H_2$ is mixed by volume ratio, reducing process can be efficiently in progress.

The starting material powder reduced by hydrogen includes Magneri phase, thus showing excellent heat-ray shielding characteristics. Accordingly, in this state as well, this starting material powder can be used as the heat-ray shielding fine particle.

From a viewpoint of weather resistance, it is preferable that the composite tungsten oxide fine particle of the present invention is subjected to surface treatment, and is coated with a compound containing one kind or more elements selected from Si, Ti, Zr, and Al, and preferably is coated with oxide. In order to perform the surface treatment, a publicly-known surface treatment may be performed using an organic compound containing one kind or more elements selected from Si, Ti, Zr, and Al. For example, the composite tungsten oxide fine particles of the present invention and an organic silicon compound are mixed, and a mixture may be subjected to hydrolysis treatment.

Further, from a viewpoint of improving the optical characteristics of the heat-ray shielding film as will be described later, a powder color of the composite tungsten oxide fine particle desirably satisfies a condition such that L* is 25 to 80, a* is −10 to 10, and b* is −15 to 15 in a powder color based on a L*a*b* surface color system (JISZ8729-2004) which is recommended by Commission Internationale de lEclairage (CIE). By using the composite tungsten oxide fine particles having this powder color, the heat-ray shielding film having excellent optical characteristics can be obtained.

(2) Dispersant

The dispersant of the present invention is used for uniformly dispersing the composite tungsten oxide fine particles of the present invention into the heat-ray shielding fine particle-containing plasticizer dispersion liquid.

It is preferable that the dispersant of the present invention has urethane, acrylic, and styrene main chains, having a thermal decomposition temperature of 200 deg C. or more which is measured by a simultaneous differential calorimetry device (described as TG-DTA hereafter in some cases). Wherein, a thermal decomposition temperature is the temperature for starting a weight reduction due to thermal decomposition of the dispersant, in TG-DTA measurement.

This is because if the thermal decomposition temperature is 200 deg C. or more, the dispersant is not decomposed when being kneaded with the polyvinyl acetal resin. Thus, it is possible to prevent brown coloring of the heat-ray shielding film for a heat-ray shielding laminated glass due to decomposition of the dispersant, reduction of a visible light transmittance, and a situation that original optical characteristics cannot be obtained.

Further, the dispersant preferably has an amine-containing group, a hydroxyl group, a carboxyl group, or an epoxy group as functional groups. These functional groups are adsorbed on a surface of the composite tungsten oxide fire particle, thus preventing agglutination of the composite tungsten oxide fine particles, and having an effect of uniformly dispersing the fine particles even in the heat-ray shielding film.

Specifically, an acrylic-styrene copolymer-based dispersant having the carboxyl group as a functional group, and an acrylic dispersant having a group containing amine as a functional group, can be given. As the dispersant having the amine-containing group as the functional group, the dispersant with a molecular weight of Mw 2000 to 200000 and an amine value of 5 to 100 mgKOH/g is preferable. Further, as the dispersant having the carboxyl group, the dispersant with a molecular weight of Mw 2000 to 200000 and an acid value of 1 to 50 mgKOH/g is preferable.

The addition amount of the dispersant is preferably in a range of 10 pts. wt. to 1000 pts. wt. and further preferably 30 pts. wt. to 400 pts. wt. based on 100 pts. wt. of the composite tungsten oxide fine particles. This is because when the dispersant addition amount is within this range, the composite tungsten oxide fine particles are uniformly dispersed in the polyvinyl acetal resin, thus not having an adverse influence on physical properties of the obtained heat-ray shielding film.

(3) The Metal Carboxylate

The metal carboxylate according to the present invention is added for the purpose of improving the weather resistance of the heat-ray shielding film and suppressing the change of the optical characteristics in a case of a long-term use of the heat-ray shielding film.

According to a knowledge of the present invention, the metal carboxylate has an effect of suppressing a degradation of the composite tungsten oxide fine particles with a lapse of time. A specific mechanism of suppressing the degradation with a lapse of time, has not been clarified yet. However, a specific effect by adding the metal carboxylate is that reduction (degradation) of the visible light transmittance at an initial time and after long-term use can be reduced, in a case of the long-term use of the heat-ray shielding film. Meanwhile, in a case of not adding the metal carboxylate, it is confirmed that the visible light transmittance is reduced (degraded) after the long-term use, compared with a case at the initial time.

As a result of various examinations by the inventors of the present invention, an effect of suppressing degradation of the visible light transmittance is confirmed, by using alkaline metal salts, alkaline earth metal salts, and transition metal salts, as the metal salts used for the metal carboxylate. For example, salts of sodium, potassium, magnesium, calcium, nickel, manganese, cerium, zinc, copper, and iron, can be given.

Further, the carboxylic acid used for the metal carboxylate is not particularly limited. For example, acetic acid, butyric acid, valeric acid, propionic acid, hexan acid, enantoic acid, carpylic acid, pelargonic acid, capric acid, lauric acid, myristic acid, palmitic acid, margaric acid, stearic acid, 2-ethylhexanoic acid, and other generally known higher fatty acid can be given.

Incidentally, nickel salt, manganese salt, and cerium salt are preferable, and manganese salt and the cerium salt are further preferable, and manganese 2-ethylhexanoate, the manganese stearate, cerium 2-ethylhexanoate, and stearic acid cerium are still further preferable as the metal salts in consideration of the heat-ray shielding characteristics and transparency of the heat-ray shielding film, and the effect of improving the weather resistance of the composite tungsten oxide fine particles.

The addition amount of the metal carboxylate is preferably in a range of 3 pts. wt. to 500 pts. wt. based on 100 pts. wt. of the composite tungsten oxide fine particles. This is because if the addition amount of the metal carboxylate is within the aforementioned range, the effect of improving the weather resistance of the composite tungsten oxide fine particles can be exhibited, thus having no adverse influence on the physical properties of the obtained heat-ray shielding film.

As a method for adding the metal carboxylate, for example, a method of adding and mixing the metal carboxylate into a dispersion liquid with the composite tungsten oxide fine particles dispersed in the plasticizer for the heat-ray shielding film, can be used. Further, when the heat-ray shielding film is fabricated, the metal carboxylate may be added to the polyvinyl acetal resin, together with the composite tungsten oxide fine particles.

In any one of the addition methods, the effect of improving the weather resistance of the composite tungsten oxide fine particles can be obtained, provided that the metal carboxylate is contained in the heat-ray shielding film, within the aforementioned range.

(4) Plasticizer

As the plasticizer used for the heat-ray shielding film mainly composed of the polyvinyl acetal resin of the present invention, plasticizer as a compound of monohydric alcohol and organic acid ester, ester-based plasticizer such as polyhydric alcohol organic acid ester compound, and phosphoric acid plasticizer such as organic phosphoric acid plasticizer, can be given, and any one of them is preferably in a liquid state at a room temperature. Particularly, the plasticizer as the ester compound synthesized from the polyhydric alcohol and fatty acid is preferable.

Although the ester compound synthesized from the polyhydric alcohol and the fatty acid is not particularly limited, for example, a glycol-based ester compound obtained by a reaction between glycol such as triethylene glycol, tetraethylene glycol, tripropylene glycol, and monobasic organic acid such as butyric acid, isobutyric acid, caproic acid, 2-ethyl butyric acid, heptyl acid, n-octylic acid, 2-ethylhexyl acid, pelargonic acid (n-nonylic acid), and decylic acid, can be given. Further, an ester compound of the tetraethylene glycol, the tripropylene glycol, and the monobasic organic acid, can also be given.

Above all, fatty acid ester of triethylene glycol hexanate, triethylene glycol di-2-ethyl butylate, torietylene glycol di-octanate, triethylene glycol di-2-ethylhexanate is suitable. The fatty acid ester of triethylene glycol has well-balanced various properties such as compatibility with polyvinyl acetal and cold-resistance, and is excellent in processability and economic efficiency.

Attention should be paid to hydrolyzability in selecting the plasticizer. From this viewpoint, triethylene glycol di-2-ethylhexanate, triethylene glycol 2-ethyl butylate, and tetraethylene glycol di-2-ethyl hexanate are preferable.

(5) The Method for Manufacturing the Heat-Ray Shielding Fine Particle-Containing Plasticizer Dispersion Liquid Regarding the method for manufacturing the heat-ray shielding fine particle-containing plasticizer dispersion liquid according to the present invention, a method for dispersing the composite tungsten oxide fine particles into the plasticizer will be described first, and the method for manufacturing the heat-ray shielding fine particle-containing plasticizer dispersion liquid will be described next.

(a) The Method for Dispersing the Composite Tungsten Oxide Fine Particles into the Heat-Ray Shielding Plasticizer When the heat-ray shielding film according to the present invention is manufactured, the composite tungsten oxide fine particles and the dispersant are added and mixed into a part of a total quantity of the plasticizer added finally to the polyvinyl acetal resin, to thereby obtain the heat-ray shielding fine particle-containing plasticizer dispersion liquid. At this time, the aforementioned (a part of) the plasticizer is preferably set to be a weight of allowing a concentration of the composite tungsten oxide fine particles in the plasticizer to be 50 mass % or less. This is because if the concentration of the composite tungsten oxide fine particles in the plasticizer is 50 mass % or less, agglutination of fine particles hardly occurs, thus facilitating dispersion, preventing a sudden increase of viscosity, and facilitating handling.

In a mixture of the (part of) the plasticizer, the composite tungsten oxide fine particles and the dispersant, the method for uniformly dispersing the composite tungsten oxide fine particles into the plasticizer, can be arbitrarily selected from general methods. As a specific example, methods such as bead mill, ball mill, sand mill, and ultrasonic dispersion, can be used.

In addition, when the composite tungsten oxide fine particles are dispersed in the plasticizer, an organic solvent having a boiling point of 120 deg C. or less may be added as needed. Specifically, toluene, methylethyl ketone, methyl isobutyl ketone, butyl acetates, isopropyl alcohol, and ethanol can be given. However, the organic solvent can be arbitrarily selected provided that it has a boiling point of 120 deg C. or less and capable of uniformly dispersing the fine particles having the heat-ray shielding function. However, when the organic solvent is added, execution of a drying step is required after completion of the dispersion, so that the remained organic solvent is set to 5 mass % or less. This is because if the remained solvent is 5 mass % or less, bubbles are not generated on a heat-ray shielding laminated transparent base material as will be described later, and an outer appearance and the optical characteristics can be satisfactorily maintained.

In the drying step, a vacuum drying method for drying the obtained mixture is preferably used. Specifically, in the vacuum drying method, the mixture is vacuum-dried while being stirred, to thereby separate a heat-ray shielding fine particle-containing composition from an organic solvent component. A vacuum stirring type drier can be given as an apparatus used for vacuum-drying. However, the apparatus is not particularly limited thereto, and the apparatus having the aforementioned function may be acceptable. Further, a vacuum-pressure in the drying step is suitably selected.

(b) The Method for Manufacturing a Plasticizer Dispersion Liquid for a Heat-Ray Shielding Film After the composite tungsten oxide fine particles are dispersed into the plasticizer using the dispersant to thereby obtain the heat-ray shielding fine particle-containing plasticizer dispersion liquid, the metal carboxylate is further added to this dispersion liquid. Then, the dispersion liquid and the metal carboxylate are mixed using a general stirring/mixing apparatus, to thereby obtain the plasticizer dispersion liquid for a heat-ray shielding film according to the present invention.

[2] the Heat-Ray Shielding Film and the Method for Manufacturing the Same

The polyvinyl acetal resin, the other additive agent, and a regulator of an adhesive force used for the heat-ray shielding film of the present invention will be described, and further the method for manufacturing the heat-ray shielding film will be described.

(1) Polyvinyl Acetal Resin

Polyvinyl butyral resin is preferable as the polyvinyl acetal resin used for the heat-ray shielding film of the present invention. Further, a plurality of kinds of polyvinyl acetal resins with different degree of acetalization may be used together in consideration of the physical properties of the heat-ray shielding film. Further, copolyvinyl acetal resin obtained by causing a reaction between a plurality of kinds of aldehydes which are combined during acetalization, can also be preferably used.

Wherein, a preferable lower limit of the acetalization of the polyvinyl acetal resin is 60% and an upper limit thereof is 75%.

The aforementioned polyvinyl acetal resin can be prepared by acetalizing the polyvinyl alcohol by aldehyde.

Usually, the aforementioned polyvinyl alcohol can be obtained by saponifying polyvinyl acetate, and the polyvinyl alcohol with the degree of saponification of 80 to 99.8 mol %, is generally used.

Further, a preferable lower limit of polymerization degree of the polyvinyl alcohol is 200, and an upper limit thereof is 3000. If the polymerization degree is 200 or more, the penetration resistance of the manufactured heat-ray shielding laminated transparent base material is maintained, thus maintaining safety. Meanwhile, if the polymerization degree is 3000 or less, moldability of a resin film is maintained, thus maintaining rigidity of the resin film in a preferably range, and also maintaining processability.

The aldehyde is not particularly limited, and aldehyde with carbon number of 1 to 10 such as n-butyl aldehyde, isobutyl aldehyde, 2-ethylbutyl aldehyde, n-hexyl aldehyde, n-octyl aldehyde, acetaldehyde, is generally used. Above all, n-butyl aldehyde, n-hexyl aldehyde, and n-valeraldehyde are preferable, and butylaldehyde with carbon number of 4 is further preferable.

The plasticizer not used for the plasticizer dispersion liquid for a heat-ray shielding film may be further added to the heat-ray shielding film of the present invention, in consideration of the physical properties of the heat-ray shielding film. For example, it is also acceptable to add an ester compound of polybasic carboxylic acid such as adipic acid, sebacic acid, azelaic acid, and linear or branched alcohol with carbon number of 4 to 8, or add a phosphoric acid-based plasticizer.

Total addition amount of these plasticizers into the heat-ray shielding film may be determined in consideration of the physical properties of the heat-ray shielding film. A desirable total addition amount is 10 mass % to 70 mass %.

(2) Other Additive Agent

A general additive agent can also be blended into the heat-ray shielding film of the present invention as needed. For example, die or pigment generally utilized for coloring a thermoplastic resin such as azo dye, cyanine dye, quinolones dye, perylene die, and carbon black, may also be added, to thereby impart an arbitrary color tone as needed.

Further, hindered phenol-based or phosphor-based stabilizers as ultraviolet absorbers, a release agent, hydroxybenzophenon, salicylic acid, HALS, triazole, triazine based organic UV, inorganic ultraviolet absorbers such as zinc oxide, titanium oxide, and cerium oxide, may also be added.

Further, a coupling agent, a surfactant, and an anti-static additive can also be used additives.

(3) The Regulator of an Adhesive Force

Further, the regulator of an adhesive force is preferably contained in the heat-ray shielding film ref the present invention.

Although the regulator of an adhesive force is not particularly limited, the alkaline metal salts and/or the alkaline earth metal salts are suitably used. Acid constituting the metal salt is not particularly limited, and for example, the carboxylic acid such as octylic acid, hexyl acid, butric acid, acetic acid, and formic acid, or inorganic acid such as hydrochloric acid and nitric acid, can be given. In the alkaline metal salts and/or the alkaline earth metal salts, carboxylic acid magnesium salt with carbon number of 2 to 16, and carboxylic acid potassium salt with carbon number of 2 to 16 are preferable.

The magnesium salt and the potassium salt of carboxylic acids, being organic acids with carbon number of 2 to 16 are not particularly limited, and for example, magnesium acetate, potassium acetate, magnesium propionate, potassium propionate, magnesium 2-ethyl butyrate, potassium 2-ethyl butyrate, magnesium 2-ethylhexanoate, potassium 2-ethylhexanoate, are suitably used.

These regulators of an adhesive force may be used alone, or two kinds or more of them may be used together. Note that in a case of using the carboxylic acid salts of sodium, potassium, magnesium, calcium, and cerim, as the regulators of an adhesive force, both of an action as an original regulator of an adhesive force and an action of improving the weather resistance of the composite tungsten oxide fine particle can be obtained.

(4) The Heat-Ray Shielding Film

The heat-ray shielding film of the present invention is obtained by mixing and kneading the plasticizer dispersion liquid for a heat-ray shielding film, the polyvinyl acetal resin, the (remained) plasticizer, and the other additives or regulators of an adhesive force as needed, and thereafter molding the mixture into a film shape by the publicly-known method such as an extrusion method and calendaring.

[3] The Heat-Ray Shielding Laminated Transparent Base Material

The heat-ray shielding laminated transparent base material using the heat-ray shielding film according to the present invention has various forms.

For example, a heat-ray shielding laminated inorganic glass using an inorganic glass as the transparent base material, is obtained by integrally sticking a plurality of opposed inorganic glasses, with the heat-ray shielding film sandwiched between them by a publicly-known method. The obtained heat-ray shielding laminated inorganic glass can be used mainly as an inorganic front glass for automobiles or windows of buildings.

Similarly to the aforementioned inorganic glass, by using the transparent resin as the transparent base material, or by using the transparent resin together with the inorganic glass, the heat-ray shielding laminated transparent base material can be obtained by sandwiching the heat-ray shielding film between the opposed transparent base materials. The purpose of use is the same as that of the heat-ray shielding laminated inorganic glass.

It is also acceptable to use the heat-ray shielding film alone, or use the heat-ray shielding film to be disposed on one surface or both surfaces of the transparent base material such as the inorganic glass or the transparent resin, depending on the purpose of use.

[4] Conclusion

As described above in detail, the composite tungsten oxide fine particles and the dispersant are dispersed into the plasticizer, to thereby obtain the heat-ray shielding fine particle-containing plasticizer dispersion liquid, and thereafter the metal carboxylate is added and mixed into the dispersion liquid, to thereby obtain the plasticizer dispersion liquid for a heat-ray shielding film.

Then, the plasticizer dispersion liquid for a heat-ray shielding film, the polyvinyl acetal resin, and the plasticizer are kneaded and further is molded into a film shape by the publicly-known method, to thereby fabricate the heat-ray shielding film having a maximum transmittance in the visible light region and having a strong absorption in the near infrared region. Then, the heat-ray shielding film is disposed so as to be sandwiched between the opposed transparent base materials, to thereby fabricate the transparent base material having the maximum transmittance in the visible light region and the strong absorption in the near infrared region, and having an excellent weather resistance property.

EXAMPLES

The present invention will be specifically described hereafter, with reference to examples. However, the present invention is not limited to the examples described below.

Further, the powder color of the composite tungsten oxide fine particles in each example (visual field: 10 degrees, light source: D65) and the visible light transmittance of the heat-ray shielding laminated inorganic glass, and the solar transmittance were measured using a spectrophotometer U-4000 by Hitachi, Ltd. Note that the solar transmittance is an index showing a heat-ray shielding performance of the heat-ray shielding laminated inorganic glass.

Further, a haze value was measured based on DISK 71.05 using HR-200 by Murakami Color Research Laboratory CO., Ltd.

The change in the optical characteristics of the heat-ray shielding film in a case of a long-term use of the heat-ray shielding laminated transparent base material, was evaluated from a change rate of the visible light transmittance before/after an acceleration test which was carried out using a xenon-arc lamp type weather resistance testing machine (xenon weather Ometer) in which the heat-ray shielding film was left for 200 hours to obtain the change rate of the visible light transmittance. Note that a relation between a wavelength of the xenon ark lamp of the xenon weather Ometer and a spectral radiant intensity (spectral distribution) is approximated to the spectral distribution of solar lights.

Example 1

50 g of $H_2WO_4$ and 18.7 g of $Cs(OH)_2$ (corresponding to Cs/W (molar ratio)=0.3) were sufficiently mixed by an agate mortar, to thereby obtain a mixed powder. The mixed powder was heated under supply of 5% H, gas with $N_2$ gas as a carrier, which was then subjected to reducing treatment for 1 hour at a temperature of 600 deg C., and thereafter was sintered at 800 deg C. for 30 minutes under. $N_2$ gas atmosphere, to thereby obtain fine particles (abbreviated as fine particles a hereafter).

A composition formula of the fine particles a was $Cs_{0.33}WO_3$, wherein the powder color was expressed in such a way that L* was 35.2845, a* was 1.4873, and b* was −5.2114.

20 mass % of fine particles a, 10 mass % of acrylic dispersant having a group containing amine as a functional group (amine value 48 mgKOH/g, acrylic dispersant with a decomposition temperature of 250 deg C. (abbreviated as dispersant a hereafter)), and 70 mass of triethylene glycol di-2-ethylhexanoate (abbreviated as plasticizer a hereafter) were weighed. They were charged into a paint shaker in which 0.3 mmϕ$ZrO_2$ beads are accommodated, which were then pulverized and dispersed for 10 hours, and manganese 2-ethylhexanoate was further added by 30 pts. wt. based on 100 pts. wt. of the fine particles a, and was stirred and mixed, to thereby prepare the plasticizer dispersion liquid for a heat-ray shielding film (abbreviated as dispersion liquid A hereafter).

Wherein, a dispersion average particle size of the tungsten oxide fine particle in the dispersion liquid A was measured by a microtrack particle size distribution analyzer by Nikkiso Co., Ltd., and it was found that the dispersion average particle size was 24 nm.

A prescribed amount of dispersion liquid A was added to a composition in which 30 mass % of plasticizer a, and 70 mass % of polyvinyl butyral resin were mixed, and the concentration of the fine particle a in this composition was set to 0.15 mass %. This composition was kneaded by a twin screw extruder at 200 deg C., and was extruded from a T-die by a calendar roll, to thereby obtain the heat-ray shielding film (abbreviated as heat-ray shielding film A hereafter) according to example 1, as a sheet with a thickness of 0.7 mm.

The obtained heat-ray shielding film A was sandwiched between two opposed inorganic glasses, and was integrally stuck thereto by the publicly-known method, to thereby obtain the heat-ray shielding laminated inorganic glass (abbreviated as a laminated transparent base material hereafter) according to example 1.

As shown in table 1, as the optical characteristics of the laminated transparent base material A, the solar transmittance was 40.1%, and the haze value was 0.5%, when the visible light transmittance was 74.0%.

The change of the visible light transmittance after 200 hours was measured by the acceleration test, using the xenon weather Ometer and using the laminated transparent base material A as a test sample. The change of the visible light transmittance was −0.6%, and the result was shown in table 1.

Example 2

The plasticizer dispersion liquid for the heat-ray shielding film (abbreviated as dispersion liquid B hereafter) according to example 2 was prepared similarly to example 1 excluding a point that manganese 2-ethylhexanoate was replaced with manganese stearate, as the metal carboxylate.

Wherein, the dispersion average particle size of the tungsten oxide fine particle in the dispersion liquid B was measured by a microtrack particle size distribution analyzer by Nikkiso Co., Ltd., and it was found that the dispersion average particle size was 25 nm.

The heat-ray shielding laminated inorganic glass (abbreviated as laminated transparent base material B hereafter) according to example 2 was obtained similarly to example 1 excluding a point that the dispersion liquid A was replaced with the dispersion liquid B.

As shown in table 1, as the optical characteristics of the laminated transparent base material B, the solar transmittance was 40.3%, and the haze value was 0.6%, when the visible light transmittance was 74.2%.

The change of the visible light transmittance after 200 hours was measured by the acceleration test, using xenon weather Ometer and using the laminated transparent base material B as a test sample. The change of the visible light transmittance was −0.6%, and the result was shown in table 1.

Example 3

The plasticizer dispersion liquid for the heat-ray shielding film (abbreviated as dispersion liquid C hereafter) according to example 3 was prepared similarly to example 1 excluding a point that manganese 2-ethylhexanoate was replaced with cerium 2-ethylhexanoate, as the metal carboxylate.

Wherein, the dispersion average particle size of the tungsten oxide fine particle in the dispersion liquid C was measured by a microtrack particle size distribution analyzer by Nikkiso Co., Ltd., and it was found that the dispersion average particle size was 18 nm.

The heat-ray shielding laminated inorganic glass (abbreviated as laminated transparent base material C hereafter) according to example 3 was obtained similarly to example 1 excluding a point that the dispersion liquid A was replaced with the dispersion liquid C.

As shown in table 1, as the optical characteristics of the laminated transparent base material C, the solar transmittance was 40.5%, and the haze value was 0.4% when the visible light transmittance was 74.3%.

The change of the visible light transmittance after 200 hours was measured by the acceleration test, using the xenon weather Ometer and using the laminated transparent base material C as a test sample. The change of the visible light transmittance was −0.7%, and the result was shown in table 1.

Example 4

The plasticizer dispersion liquid for the heat-ray shielding film (abbreviated as dispersion liquid D hereafter) according to example 4 was prepared similarly to example 1 excluding a point that manganese 2-ethylhexanoate was replaced with cerium stearate, as the metal carboxylate.

Wherein, the dispersion average particle size of the tungsten oxide fine particle in the dispersion liquid D was measured by a microtrack particle size distribution analyzer by Nikkiso Co., Ltd., and it was found that the dispersion average particle size was 30 nm.

The heat-ray shielding laminated inorganic glass (abbreviated as laminated transparent base material D hereafter) according to example 4 was obtained similarly to example 1 excluding a point that the dispersion liquid A was replaced with the dispersion liquid D.

As shown in table 1, as the optical characteristics of the laminated transparent base material D, the solar transmittance was 40.8%, and the haze value was 0.5%, when the visible light transmittance was 74.4%.

The change of the visible light transmittance after 200 hours was measured by the acceleration test, using the xenon weather Ometer and using the laminated transparent base material D as a test sample. The change of the visible light transmittance was −0.5%, and the result was shown in table 1.

Example 5

The plasticizer dispersion liquid for the heat-ray shielding film (abbreviated as dispersion liquid E hereafter) according to example 5 was prepared similarly to example 1 excluding a point that manganese 2-ethylhexanoate was replaced with manganese acetate, as the metal carboxylate.

Wherein, the dispersion average particle size of the tungsten oxide fine particle in the dispersion liquid E was measured by a microtrack particle size distribution analyzer by Nikkiso Co., Ltd., and it was found that the dispersion average particle size was 22 nm.

The heat-ray shielding laminated inorganic glass (abbreviated as laminated transparent base material E hereafter) according to example 5 was obtained similarly to example 1 excluding a point that the dispersion liquid A was replaced with the dispersion liquid E.

As shown in table 1, as the optical characteristics of the laminated transparent base material E, the solar transmittance was 40.1%, and the haze value was 0.6%, when the visible light transmittance was 71.5%.

The change of the visible light transmittance after 200 hours was measured by the acceleration test, using the xenon weather Ometer and using the laminated transparent base material E as a test sample. The change of the visible light transmittance was −0.6%, and the result was shown in table 1.

Example 6

The plasticizer dispersion liquid for the heat-ray shielding film (abbreviated as dispersion liquid F hereafter) according to example 6 was prepared similarly to example 1 excluding a point that manganese 2-ethylhexanoate was replaced with cerium acetate, as the metal carboxylate.

Wherein, the dispersion average particle size of the tungsten oxide fine particle in the dispersion liquid F was measured by a microtrack particle size distribution analyzer by Nikkiso Co., Ltd., and it was found that the dispersion average particle size was 40 nm.

The heat-ray shielding laminated inorganic glass (abbreviated as laminated transparent base material F hereafter) according to example 6 was obtained similarly to example L excluding a point that the dispersion liquid A was replaced with the dispersion liquid F.

As shown in table 1, as the optical characteristics of the laminated transparent base material F, the solar transmittance was 40.3%, and the haze value was 0.9%, when the visible light transmittance was 71.9%.

The change of the visible light transmittance after 200 hours was measured by the acceleration test, using the xenon weather Ometer and using the laminated transparent base material F as a test sample. The change of the visible light transmittance was −0.8%, and the result was shown in table 1.

Example 7

The plasticizer dispersion liquid for the heat-ray shielding film (abbreviated as dispersion liquid G hereafter) according to example 7 was prepared similarly to example 1 excluding point that manganese 2-ethylhexanoate was replaced with nickel acetate, as the metal carboxylate.

Wherein, the dispersion average particle size of the tungsten oxide fine particle in the dispersion liquid G was measured by a microtrack particle size distribution analyzer by Nikkiso Co., Ltd., and it was found that the dispersion average particle size was 27 nm.

The heat-ray shielding laminated inorganic glass (abbreviated as laminated transparent base material G hereafter) according to example 7 was obtained similarly to example 1 excluding a point that the dispersion liquid A was replaced with the dispersion liquid.

As shown in table 1, as the optical characteristics of the laminated transparent base material G, the solar transmittance was 40.3%, and the haze value was 0.6%, when the visible light transmittance was 71.4%.

The change of the visible light transmittance after 200 hours was measured by the acceleration test, using the xenon weather Ometer and using the laminated transparent base material G as a test sample. The change of the visible light transmittance was −1.4%, and the result was shown in table 1.

Example 8

The plasticizer dispersion liquid for the heat-ray shielding film (abbreviated as dispersion H hereafter) according to example 8 was prepared similarly to example 1 excluding a point that manganese 2-ethylhexanoate was replaced with magnesium acetate, as the metal carboxylate.

Wherein, the dispersion average particle size of the tungsten oxide fine particle in the dispersion liquid H was measured by a microtrack particle size distribution analyzer by Nikkiso Co., Ltd., and it was found that the dispersion average particle size was 2.8 nm.

The heat-ray shielding laminated inorganic glass (abbreviated as laminated transparent base material H hereafter) according to example 8 was obtained similarly to example 1 excluding a point that the dispersion liquid A was replaced with the dispersion liquid H.

As shown in table 1, as the optical characteristics of the laminated transparent base material H, the solar transmittance was 40.5%, and the haze value was 0.4%, when the visible light transmittance was 74.3%.

The change of the visible light transmittance after 200 hours was measured by the acceleration test, using the xenon weather Ometer and using the laminated transparent base material H as a test sample. The change of the visible light transmittance was −1.9%, and the result was shown in table 1.

Example 9

The plasticizer dispersion liquid for the heat-ray shielding film (abbreviated as dispersion liquid I hereafter) according to example 9 was prepared similarly to example 1 excluding a point that manganese 2-ethylhexanoate was replaced with calcium acetate, as the metal carboxylate.

Wherein, the dispersion average particle size of the tungsten oxide fine particle in the dispersion liquid I was measured by a microtrack particle size distribution analyzer by Nikkiso Co., Ltd., and it was found that the dispersion average particle size was 20 nm.

The heat-ray shielding laminated inorganic glass (abbreviated as laminated transparent base material hereafter) according to example 9 was obtained similarly to example 1 excluding a point that the dispersion liquid A was replaced with the dispersion liquid I.

As shown in table 1, as the optical characteristics of the laminated transparent base material I, the solar transmittance was 40.8%, and the haze value was 0.5%, when the visible light transmittance was 74.4%.

The change of the visible light transmittance after 200 hours was measured by the acceleration test, using the xenon weather Ometer and using the laminated transparent base material I as a test sample. The change of the visible light transmittance was −2.1%, and the result was shown in table 1.

Example 10

The plasticizer dispersion liquid for the heat-ray shielding film (abbreviated as dispersion liquid J hereafter) according to example 10 was prepared similarly to example 1 excluding a point that manganese 2-ethylhexanoate was replaced with nickel 2-ethylhexanoate, as the metal carboxylate.

Wherein, the dispersion average particle size of the tungsten oxide fine particle in the dispersion liquid J was measured by a microtrack particle size distribution analyzer by Nikkiso Co., Ltd., and it was found that the dispersion average particle size was 24 nm.

The heat-ray shielding laminated inorganic glass (abbreviated as laminated transparent base material J hereafter) according to example 10 was obtained similarly to example 1 excluding a point that the dispersion liquid A was replaced with the dispersion liquid J.

As shown in table 1, as the optical characteristics of the laminated transparent base material J, the solar transmittance was 40.1%, and the haze value was 0.5%, when the visible light transmittance was 74.0%.

The change of the visible light transmittance after 200 hours was measured by the acceleration test, using the xenon weather Ometer and using the laminated transparent base material J as a test sample. The change of the visible light transmittance was −1.0%, and the result was shown in table 1.

Example 11

The plasticizer dispersion liquid for the heat-ray shielding film (abbreviated as dispersion liquid K hereafter) according to example 11 was prepared similarly to example 1 excluding a point that manganese 2-ethylhexanoate was added by 3 pts. wt. based on 100 pts. wt. of the fine particles a.

Wherein, the dispersion average particle size of the tungsten oxide fine particle in the dispersion liquid K was measured by a microtrack particle size distribution analyzer by Nikkiso Co., Ltd., and it was found that the dispersion average particle size was 22 nm.

The heat-ray shielding laminated inorganic glass (abbreviated as laminated transparent base material K hereafter) according to example 11 was obtained similarly to example 1 excluding a point that the dispersion liquid A was replaced with the dispersion liquid K.

As shown in table 1, as the optical characteristics of the laminated transparent base material K, the solar transmittance was 40.8%, and the haze value was 0.5%, when the visible light transmittance was 74.5%.

The change of the visible light transmittance after 200 hours was measured by the acceleration test, using the xenon weather Ometer and using the laminated transparent base material K as a test sample. The change of the visible light transmittance was −1.9%, and the result was shown in table 1.

Example 12

The plasticizer dispersion liquid for the heat-ray shielding film (abbreviated as dispersion liquid L hereafter) according to example 11 was prepared similarly to example 1 excluding a point that manganese 2-ethylhexanoate was added by 10 pts. wt. based on 100 pts. wt. of the fine particles a.

Wherein, the dispersion average particle size of the tungsten oxide fine particle in the dispersion liquid L was measured by a microtrack particle size distribution analyzer by Nikkiso Co., Ltd., and it was found that the dispersion average particle size was 25 nm.

The heat-ray shielding laminated inorganic glass (abbreviated as laminated transparent base material L hereafter) according to example 12 was obtained similarly to example 1 excluding a point that the dispersion liquid A was replaced with the dispersion liquid L.

As shown in table 1, as the optical characteristics of the laminated transparent base material L, the solar transmittance was 40.3%, and the haze value was 0.6%, when the visible light transmittance was 74.2%.

The change of the visible light transmittance after 200 hours was measured by the acceleration test, using the xenon weather Ometer and using the laminated transparent base material L as a test sample. The change of the visible light transmittance was −1.5%, and the result was shown in table 1.

Example 13

The plasticizer dispersion liquid for the heat-ray shielding film (abbreviated as dispersion liquid M hereafter) according to example 13 was prepared similarly to example 1 excluding a point that manganese 2-ethylhexanoate was added by 100 pts. wt. based on 100 pts. wt. of the fine particles a.

Wherein, the dispersion average particle size of the tungsten oxide fine particle in the dispersion liquid M was measured by a microtrack particle size distribution analyzer by Nikkiso Co., Ltd., and it was found that the dispersion average particle size was 19 nm.

The heat-ray shielding laminated inorganic glass (abbreviated as laminated transparent base material M hereafter) according to example 13 was obtained similarly to example 1 excluding a point that the dispersion liquid A was replaced with the dispersion liquid L.

As shown in table 1, as the optical characteristics of the laminated transparent base material M, the solar transmittance was 39.7%, and the haze value was 0.4%, when the visible light transmittance was 73.9%.

The change of the visible light transmittance after 200 hours was measured by the acceleration test, using the xenon weather Ometer and using the laminated transparent base material M as a test sample. The change of the visible light transmittance was −0.6%, and the result was shown in table 1.

Example 14

The plasticizer dispersion liquid for the heat-ray shielding film (abbreviated as dispersion liquid N hereafter) according to example 14 was prepared similarly to example 1 excluding a point that manganese 2-ethylhexanoate was added by 500 pts. wt. based on 100 pts. wt. of the fine particles a.

Wherein, the dispersion average particle size of the tungsten oxide fine particle in the dispersion liquid N was measured by a microtrack particle size distribution analyzer by Nikkiso Co., Ltd., and it was found that the dispersion average particle size was 23 nm.

The heat-ray shielding laminated inorganic glass (abbreviated as laminated transparent base material hereafter) according to example 14 was obtained similarly to example 1 excluding a point that the dispersion liquid A was replaced with the dispersion liquid N.

As shown in table 1, as the optical characteristics of the laminated transparent base material N, the solar transmittance was 40.8%, and the haze value was 0.5%, when the visible light transmittance was 74.4%.

The change of the visible light transmittance after 200 hours was measured by the acceleration test, using the xenon weather Ometer and using the laminated transparent base material N as a test sample. The change of the visible light transmittance was −0.5%, and the result was shown in table 1.

Example 15

8.8 g of $RbNO_3$ was dissolved into 13.5 g of water, which was then added to 45.3 g of $H_2WO_4$ (corresponding to Rb/W (molar ratio)=0.33), and was sufficiently stirred, and thereafter was dried. The dried material was heated under supply of 2% $H_2$ gas with $N_2$ gas as a carrier, and was sintered for 30 minutes at a temperature of 800 deg C., and thereafter was sintered for 90 minutes under $N_2$ gas atmosphere at the same temperature, to thereby obtain fine particles (abbreviated as fine particles b hereafter).

The composition formula of the fine particles b was expressed by $Rb_{0.33}WO_3$, wherein the powder color was expressed in such a way that L* was 36.3765, a* was −0.2145, and b* was −3.7609.

The plasticizer dispersion liquid for a heat-ray shielding film (abbreviated as dispersion liquid O hereafter) according to example 15 was prepared similarly to example 1, excluding a point that the fine particles a were replaced with the fine particles b as the composite tungsten oxide fine particles.

Wherein, the dispersion average particle size of the tungsten oxide fine particle in the dispersion liquid O was measured by a microtrack particle size distribution analyzer by Nikkiso Co., Ltd., and it was found that the dispersion average particle size was 27 nm.

The heat-ray shielding laminated inorganic glass (abbreviated as laminated transparent base material O hereafter) according to example 15 was obtained similarly to example 1 excluding a point that the dispersion liquid A was replaced with the dispersion liquid O.

As shown in table 1, as the optical characteristics of the laminated transparent base material O, the solar transmittance was 40.1%, and the haze value was 0.5%, when the visible light transmittance was 73.5%.

The change of the visible light transmittance after 200 hours was measured by the acceleration test, using the xenon weather Ometer and using the laminated transparent base material O as a test sample. The change of the visible light transmittance was −0.6%, and the result was shown in table 1.

Comparative Example 1

The plasticizer dispersion liquid for the heat-ray shielding film (abbreviated as dispersion liquid P hereafter) according to comparative example 1 was prepared similarly to example 1 excluding a point that manganese 2-ethylhexanoate was not added.

Wherein, the dispersion average particle size of the tungsten oxide fine particle in the dispersion liquid P was measured by a microtrack particle size distribution analyzer by Nikkiso Co., Ltd., and it was found that the dispersion average particle size was 25 nm.

The heat-ray shielding laminated inorganic glass (abbreviated as laminated transparent base material P hereafter) according to comparative example 1 was obtained similarly to example 1 excluding a point that the dispersion liquid A was replaced with the dispersion liquid P.

As shown in table 1, as the optical characteristics of the laminated transparent base material P, the solar transmittance was 40.6%, and the haze value was 0.5%, when the visible light transmittance was 74.3%.

The change of the visible light transmittance after 200 hours was measured by the acceleration test, using the xenon weather Ometer and using the laminated transparent base material P as a test sample. The change of the visible light transmittance was −13.2%. The reason can be considered that since the metal carboxylate is not added, the composite tungsten oxide fine particles are degraded with a lapse of time, thus increasing the change of the visible light transmittance. The result was shown in table 1.

Comparative Example 2

The plasticizer dispersion liquid for the heat-ray shielding film (abbreviated as dispersion liquid Q hereafter) according to comparative example 2 was prepared similarly to example 1 excluding a point that manganese 2-ethyl hexanoate was added by 1.5 pts. wt based on 100 pts. wt. of the fine particles a.

Wherein, the dispersion average particle size of the tungsten oxide fine particle in the dispersion liquid Q was measured by a microtrack particle size distribution analyzer by Nikkiso Co., Ltd., and it was found that the dispersion average particle size was 27 nm.

The heat-ray shielding laminated inorganic glass (abbreviated as laminated transparent base material Q hereafter according to comparative example 2 was obtained similarly to example 1 excluding a point that the dispersion liquid A was replaced with the dispersion liquid Q.

As shown in table 1, as the optical characteristics of the laminated transparent base material Q, the solar transmittance was 40.1%, and the haze value was 0.5%, when the visible light transmittance was 74.2%.

The change of the visible light transmittance after 200 hours was measured by the acceleration test, using the xenon weather Ometer and using the laminated transparent base material Q as a test sample. The change of the visible light transmittance was −9.2%. The reason can be considered that owing to less addition amount of the metal carboxylate, the effect of improving the weather resistance of the composite tungsten oxide fine particles cannot be obtained sufficiently, thus increasing the change of the visible light transmittance. The result was shown in table 1.

Comparative Example 3

The plasticizer dispersion liquid for the heat-ray shielding film (abbreviated as dispersion liquid R hereafter) according to comparative example 3 was prepared similarly to example 1 excluding a point that manganese 2-ethylhexanoate was added by 700 pts. wt. based on 100 pts. wt. of the fine particles a.

Wherein, the dispersion average particle size of the tungsten oxide fine particle in the dispersion liquid R was measured by a microtrack particle size distribution analyzer by Nikkiso Co., Ltd., and it was found that the dispersion average particle size was 21 nm.

The heat-ray shielding laminated inorganic glass (abbreviated as laminated transparent base material R hereafter) according to comparative example 3 was obtained similarly to example 1 excluding a point that the dispersion liquid A was replaced with the dispersion liquid R.

As shown in table 1, as the optical characteristics of the laminated transparent base material R, the solar transmittance was 39.8%, and the haze value was 0.5%, when the visible light transmittance was 73.9%.

However, the laminated transparent base material R involves a problem that the inorganic glass and the heat-ray shielding film are easily peeled-off, due to insufficient adhesion between the inorganic glass and the heat-ray shielding film.

The reason can be considered as follows. Sufficient adhesion cannot be obtained between the heat-ray shielding film and the inorganic glass, due to excessively increased addition amount of the metal carboxylate.

The acceleration test using the xenon weather Ometer was not executed.

TABLE 1

| | Heat-ray shielding film | | | | Optical characteristics of heat-ray shielding laminated transparent base material | | | Weather resistance test Change of |
|---|---|---|---|---|---|---|---|---|
| | Composite tungsten oxide fine particle | | Metal carboxylate | | | | | |
| | Kind | Average particle size (nm) | Kind | Addition ✕1 amount (pts.) | Visible light transmittance (%) | Solar transmittance (%) | Haze (%) | visible light transmittance (%) |
| Example 1 | a | 24 | Manganese 2-ethylhexanoate | 30 | 74.0 | 40.1 | 0.5 | −0.6 |
| Example 2 | a | 25 | Manganese stearate | 30 | 74.2 | 40.3 | 0.6 | −0.6 |
| Example 3 | a | 18 | Cerium 2-ethylhexanoate | 30 | 74.3 | 40.5 | 0.4 | −0.7 |
| Example 4 | a | 30 | Stearic acid cerium | 30 | 74.4 | 40.8 | 0.5 | −0.5 |
| Example 5 | a | 22 | Manganese acetate | 30 | 71.5 | 40.1 | 0.6 | −0.6 |
| Example 6 | a | 40 | Cerium acetate | 30 | 71.9 | 40.3 | 0.9 | −0.8 |
| Example 7 | a | 27 | Nickel acetate | 30 | 71.4 | 40.3 | 0.6 | −1.4 |
| Example 8 | a | 18 | Manganese acetate | 30 | 74.3 | 40.5 | 0.4 | −1.9 |
| Example 9 | a | 20 | Calcium acetate | 30 | 74.4 | 40.8 | 0.5 | −2.1 |
| Example 10 | a | 24 | Nickel 2-ethylhexanoate | 30 | 74.0 | 40.1 | 0.5 | −1.0 |

TABLE 1-continued

| | Heat-ray shielding film | | | | Optical characteristics of heat-ray shielding laminated transparent base material | | | Weather resistance test Change of |
|---|---|---|---|---|---|---|---|---|
| | Composite tungsten oxide fine particle | | Metal carboxylate | | | | | |
| | Kind | Average particle size (nm) | Kind | Addition ※1 amount (pts.) | Visible light transmittance (%) | Solar transmittance (%) | Haze (%) | visible light transmittance (%) |
| Example 11 | a | 22 | Manganese 2-ethylhexanoate | 3 | 74.5 | 40.8 | 0.5 | −1.9 |
| Example 12 | a | 25 | Manganese 2-ethylhexanoate | 10 | 74.2 | 40.3 | 0.6 | −1.5 |
| Example 13 | a | 19 | Manganese 2-ethylhexanoate | 100 | 73.9 | 39.7 | 0.4 | −0.6 |
| Example 14 | a | 23 | Manganese 2-ethylhexanoate | 500 | 74.4 | 40.8 | 0.5 | −0.5 |
| Example 15 | b | 27 | Manganese 2-ethylhexanoate | 30 | 73.5 | 40.1 | 0.5 | −0.6 |
| Com* Example 1 | a | 25 | Not added | — | 74.3 | 40.6 | 0.5 | −13.2 |
| Com* Example 2 | a | 27 | Manganese 2-ethylhexanoate | 1.5 | 74.2 | 40.1 | 0.5 | −9.2 |
| Com* Example 3 | a | 21 | Manganese 2-ethylhexanoate | 700 | 73.9 | 39.8 | 0.5 | Not executed |

※1: Ratio based on 100 pts. wt. of composite tungsten oxide fine particles
※2: Com* . . . Comparative Example Evaluation of Examples 1 to 15 and Comparative Examples 1 to 3

In examples 1 to 15, laminated transparent base materials A to O with high visible light transmittance excellent heat-ray shielding characteristics, and low haze value, can be obtained. Further, laminated transparent base materials A to O are obtained, which are capable of suppressing the degradation of the composite tungsten oxide fine particles by adding the metal carboxylate, and exhibiting high weather resistance such as small change of the optical characteristics in a case of a long-term use.

Meanwhile, in comparative examples 1 and 2, the metal carboxylate is not added or the addition amount is small, and therefore in the xenon weather Ometer acceleration test, the composite tungsten oxide fine particle is degraded with a lapse of time, thus increasing the change of the visible light transmittance in laminated transparent base materials P and Q, and it cannot be said that comparative examples 1 and 2 are practical. Further, in comparative example 3, the addition amount of the metal carboxylate is large, and therefore the adhesion to the inorganic glass, which is an important physical property as the heat-ray shielding film, is damaged.

The invention claimed is:

1. A heat-ray shielding film containing fine particles having a heat-ray shielding function, polyvinyl acetal resin, a metal carboxylate, and a plasticizer,
wherein the fine particles having the heat-ray shielding function consist of composite tungsten oxide fine particles having a hexagonal crystal structure and are expressed by a general formula MyWOz (wherein M is one kind or more elements selected from a group consisting of Cs, Rb, K, Tl, In, Ba, Ca, Sr, Fe, Sn, Al, and Cu, satisfying $0.1<=y<=0.5$, $2.2<=z<=3.0$), and
wherein the metal carboxylate is selected from the group consisting of cerium 2-ethylhexanoate, cerium stearate, and nickel 2-ethylhexanoate, and
wherein a content of the metal carboxylate is from 3 pts. wt. to 500 pts. wt. based on 100 pts. wt. of the composite tungsten oxide fine particles.

2. The heat-ray shielding film according to claim 1, wherein the metal carboxylate is cerium 2-ethylhexanoate.

3. The heat-ray shielding film according to claim 1, wherein the metal carboxylate is cerium stearate.

4. The heat-ray shielding film according to claim 1, wherein the metal carboxylate nickel 2-ethylhexanoate.

5. The heat-ray shielding film according to claim 1, wherein the composite tungsten oxide fine particles are fine particles with an average particle size of 40 nm or less.

6. A heat-ray shielding laminated transparent base material, comprising the heat-ray shielding film of claim 1 arranged between a plurality of transparent base materials.

7. The heat-ray shielding laminated transparent base material according to claim 6, wherein at least one of the transparent base materials is glass.

* * * * *